(12) United States Patent
Johnston et al.

(10) Patent No.: US 9,100,415 B2
(45) Date of Patent: Aug. 4, 2015

(54) ON-NET DIRECT ACCESS TO VOICEMAIL

(75) Inventors: Michelle Madden Johnston, Rockville, MD (US); Euclid S. Brooks, Laurel, MD (US); Vikas V. Sahdev, Laurel, MD (US); Steven Leon Spak, Columbia, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1136 days.

(21) Appl. No.: 12/640,464

(22) Filed: Dec. 17, 2009

(65) Prior Publication Data

US 2011/0149948 A1    Jun. 23, 2011

(51) Int. Cl.
| | |
|---|---|
| *H04L 29/06* | (2006.01) |
| *H04L 12/66* | (2006.01) |
| *H04M 3/533* | (2006.01) |
| *H04M 1/64* | (2006.01) |

(52) U.S. Cl.
CPC ........ *H04L 65/1063* (2013.01); *H04L 65/1006* (2013.01); *H04L 65/1096* (2013.01); *H04L 12/66* (2013.01); *H04M 1/64* (2013.01); *H04M 3/533* (2013.01); *H04M 2203/4509* (2013.01); *H04M 2215/62* (2013.01)

(58) Field of Classification Search
CPC . H04L 65/1006; H04L 65/1063; H04L 12/66; H04L 65/1096; H04M 3/533; H04M 2203/4509; H04M 2215/62; H04M 1/64
USPC ......... 370/352–356; 379/88.18–88.27, 93.24; 455/412.1, 412.2, 413
See application file for complete search history.

(56) References Cited

U.S. PATENT DOCUMENTS

| | | | | |
|---|---|---|---|---|
| 5,995,596 | A * | 11/1999 | Shaffer et al. | 379/88.18 |
| 6,243,374 | B1 * | 6/2001 | White et al. | 370/352 |
| 6,539,077 | B1 * | 3/2003 | Ranalli et al. | 379/67.1 |
| 6,665,532 | B1 * | 12/2003 | Boland et al. | 455/413 |
| 7,139,552 | B1 * | 11/2006 | Evans et al. | 455/412.1 |
| 7,376,139 | B1 * | 5/2008 | McDonald et al. | 370/410 |
| 7,787,602 | B2 * | 8/2010 | Pearson et al. | 379/88.21 |
| 7,860,224 | B1 * | 12/2010 | Barzegar et al. | 379/88.17 |
| 8,116,744 | B1 * | 2/2012 | Mikan et al. | 455/413 |
| 8,265,602 | B2 * | 9/2012 | Shaw | 455/412.1 |
| 8,385,232 | B1 * | 2/2013 | Chen et al. | 370/259 |
| 8,774,174 | B2 * | 7/2014 | James et al. | 370/356 |
| 2005/0157704 | A1 * | 7/2005 | Lim | 370/352 |
| 2005/0180548 | A1 * | 8/2005 | Moore | 379/88.12 |
| 2005/0201534 | A1 * | 9/2005 | Ignatin | 379/88.22 |
| 2005/0287993 | A1 * | 12/2005 | Gogic | 455/413 |
| 2006/0025114 | A1 * | 2/2006 | Bales et al. | 455/413 |
| 2007/0280209 | A1 * | 12/2007 | Ramani | 370/356 |
| 2008/0043969 | A1 * | 2/2008 | Shi | 379/211.02 |
| 2008/0101338 | A1 * | 5/2008 | Reynolds et al. | 370/352 |

(Continued)

*Primary Examiner* — Luat Phung
*Assistant Examiner* — Kai Chang (57) ABSTRACT

A device in a provider network receives a Session Initiation Protocol (SIP) request message from an originating device, where the SIP request message includes a general number for a voicemail service and where the voicemail service includes multiple voicemail systems. The device determines whether the originating device is associated with a voice-over-Internet-protocol (VoIP) account on the provider network and, when the originating device is associated with a VoIP account, selects a direct access number assigned to a voicemail system, from the multiple voicemail systems in the network, that services the VoIP account. The device also associates the direct access number and the SIP request message, and forwards, based on the direct access number, the SIP request message to an application server.

20 Claims, 7 Drawing Sheets

(56) References Cited

U.S. PATENT DOCUMENTS

| | | | |
|---|---|---|---|
| 2008/0159493 A1* | 7/2008 | Hagale et al. | 379/88.22 |
| 2009/0041211 A1* | 2/2009 | Bolden et al. | 379/88.12 |
| 2009/0131045 A1* | 5/2009 | Feuer et al. | 455/426.1 |
| 2009/0168986 A1* | 7/2009 | Jackson et al. | 379/211.01 |
| 2009/0180597 A1* | 7/2009 | Jackson et al. | 379/88.13 |
| 2009/0220059 A1* | 9/2009 | Brooks et al. | 379/88.17 |
| 2009/0238174 A1* | 9/2009 | Veenstra et al. | 370/352 |
| 2010/0056113 A1* | 3/2010 | Silverman | 455/413 |
| 2010/0158201 A1* | 6/2010 | Vijay Marathe et al. | 379/36 |
| 2011/0064206 A1* | 3/2011 | Karnalkar et al. | 379/88.13 |

\* cited by examiner

ON-NET DIRECT ACCESS TO VOICEMAIL

BACKGROUND INFORMATION

In some voice-over-Internet-Protocol (VoIP) networks, it may be desirable to provide voicemail services that customers may access using a single access number (e.g., a toll-free number). Customers may dial the single access number whether on-net (e.g., calling from a recognized device associated with an account in the VoIP network) or off-net to access their voice mailboxes. In some networks, customer accounts may be distributed among multiple voicemail systems. On-net VoIP calls to the single access number are typically routed to a single application server, from which a customer's call may be routed to the appropriate voicemail system. Using a single application server to manage all calls for multiple voicemail systems may eventually overload the application server.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Aspects described herein may provide systems and/or methods that translate a single general access number (e.g., a toll-free number) so that on-net calls to VoIP subscribers' voice mailboxes may be routed across one of multiple application servers to one of multiple voicemail systems. Rules may be implemented at a session border controller (SBC) to route calls using the general access number to one of multiple applications servers based on, for example, geographic information determined from an incoming call. Geography of an incoming on-net call may be determined using a telephone number included within a Session Initiation Protocol (SIP) request "From" header, or P-Asserted-Identity (PAI) header, of the on-net VoIP call. Based on a determined geography of the caller, the SBC may conduct a lookup to match the incoming call with an appropriate application server and modify the SIP request for the VoIP call to point to the appropriate application server.

As used herein, the terms "user," "caller," "customer," and "subscriber" may be used interchangeably and are intended to be broadly interpreted to include customer premises equipment or a user of customer premises equipment.

Figure 1:
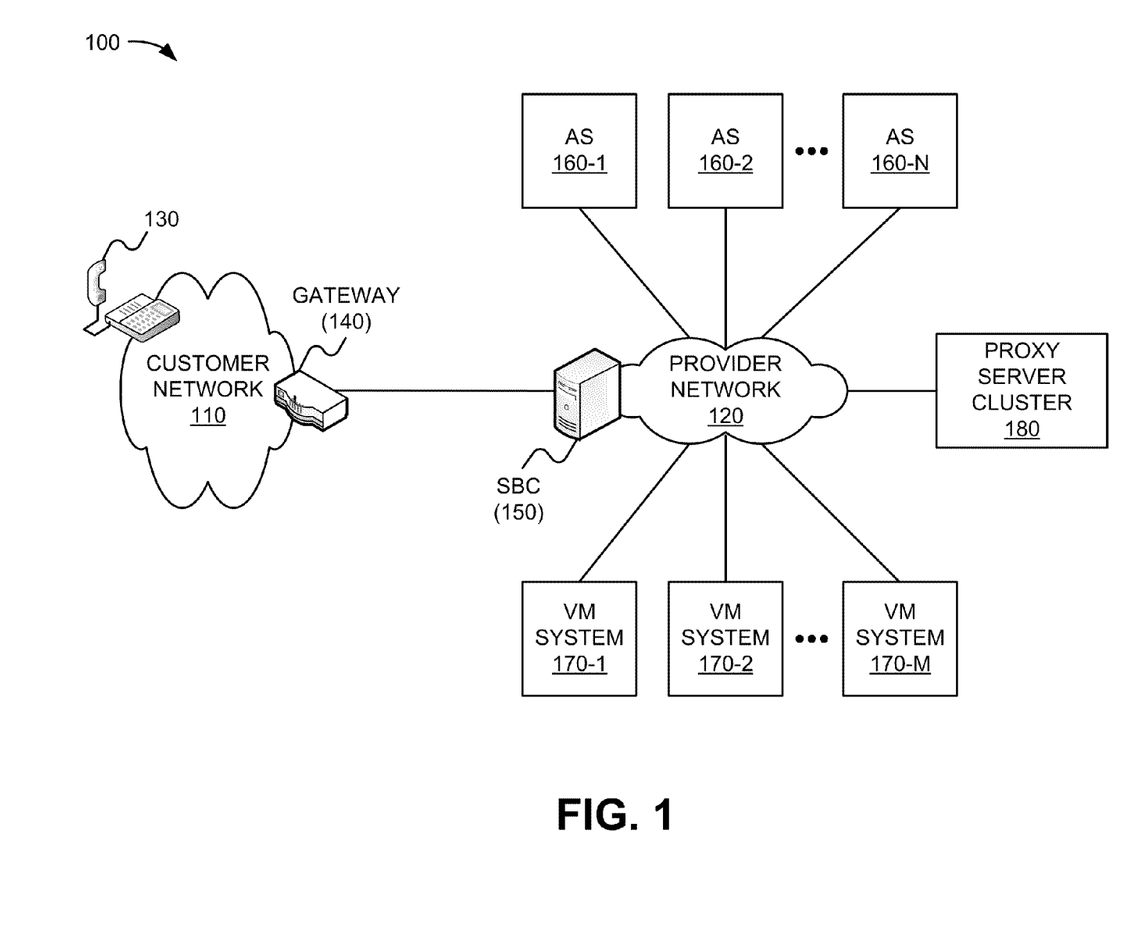
FIG. 1 depicts an exemplary network in which systems and/or methods described herein may be implemented.

FIG. 1 is a diagram of an exemplary network 100 in which systems and/or methods described herein may be implemented. As illustrated, network 100 may include a customer network 110 and a provider network 120. Customer network 110 may include one or more customer premises equipment (CPE) 130 (e.g., VoIP-enabled devices) and a gateway 140. Provider network 120 may include a SBC 150, multiple application servers 160-1, 160-2, . . . 160-N (referred to herein collectively as "application servers 160" and generically as "application server 160"), multiple voicemail (VM) systems 170-1, 170-2, . . . 170-M (referred to herein collectively as "VM systems 170" and generically as "VM system 170"), and a proxy server cluster 180. Components of network 100 may interconnect via wired and/or wireless connections. Additionally, or alternatively, the connections between components may be direct or indirect.

For simplicity, one customer network 110, one provider network 120, one CPE 130, one gateway 140, one SBC 150, three application servers 160, three VM systems 170, and one proxy server cluster 180 have been illustrated in FIG. 1. In practice, there may be more or fewer customer networks 110, provider networks 120, CPEs 130, gateways 140, SBCs 150, application servers 160, VM systems 170, and/or proxy server clusters 180. Also, in some instances, one or more of the components of network 100 may perform one or more functions described as being performed by another one or more of the components of network 100.

Customer network 110 may include a local area network (LAN), a wide area network (WAN), or a combination of networks that provide data and/or voice services to a customer or end user. In one implementation, customer network 110 may include a network interconnecting one or more devices (e.g., CPE 130), such as devices providing data services (e.g., personal computers, workstations, laptops, etc.), devices providing voice services (e.g., telephones), and/or devices providing video services (e.g., televisions, set-top boxes, etc.).

Provider network 120 may represent a network used to route customer data traffic to/from various devices in network 100. Provider network 120 may include devices, systems, and/or protocols that provide switching and/or routing of packets. For example, provider network 120 may include Multi-Protocol Label Switching (MPLS) devices, systems, and protocols. Protocols other than MPLS may also be used in provider network 120. Provider network 120 may include one or more sub-networks of any type, including a LAN, a WAN, a satellite network, a metropolitan area network (MAN), a telephone network, such as the public switched telephone network (PSTN) or a Public Land Mobile Network (PLMN), an ad hoc network, an intranet, the Internet, or a combination of networks. The PLMN(s) may further include a packet-switched sub-network, such as, for example, a General Packet Radio Service (GPRS), Cellular Digital Packet Data (CDPD), or Mobile IP sub-network.

CPE 130 may include any device or combination of devices that may communicate and/or facilitate VoIP sessions within customer network 110. CPE 130 may include one or more of personal computers, laptops, telephones, personal digital assistants (PDAs), or another type of computation or communication device that enable VoIP communications. For example, in one implementation CPE 130 may be a SIP-enabled device. CPE 130 may include one or more computer systems for hosting programs, databases, and/or applications.

Gateway 140 may include a data transfer device, such as a gateway, a router, a switch, a firewall, a network interface card (NIC), a hub, a bridge, a proxy server, an optical add-drop multiplexer (OADM), or some other type of device that processes and/or transfers data. Gateway 140 may allow and/or controls access to another device or network. For example, Gateway 140 may interconnect CPE 130 in customer network 110 to a service provider (e.g., SBC 150). Gateway 140 may perform various functions, such as protocol translation, impedance matching, rate conversion, signaling translation, routing, address translation, etc. As will be described below, gateway 140 may be a device that registers with SBC 150 and/or application servers 160 according to Session Initiation Protocol. Gateway 140 may connect to SBC 150 over, for example, a WAN link, to transmit and receive IP packets.

SBC 150 may include one or more computation or communication devices for managing signaling and/or media streams. SBC 150 may form a border to and from a service provider network (e.g., provider network 120). In one implementation, SBC 150 may receive and respond to SIP messages to manage VoIP and other media services for customer network 110. SBC 150 may also include one or more databases. In one implementation, SBC 150 may refer to a database of information associated with registered CPE 130, application servers 160, and/or VM systems 170 to direct on-net calls from a general VM access number to a direct VM access telephone number. For example, SBC 150 may rewrite a SIP request message with a direct access number before forwarding it. SBC 150 may also include other devices, such as a firewall, a switch, and a router (not shown).

Application server 160 may include one or more server entities, or other types of computation or communication devices, that function as an intermediary mechanism and act as both a server and a client for the purpose of making SIP requests on behalf of other clients (e.g., CPE 130). Application server 160 may, for example, interpret, and, if necessary, rewrite a SIP request message before forwarding it. Application server 160 may also include security, call routing (e.g., static and dynamic registrations), call-forwarding, privacy, accounting, and/or stateful or stateless transaction capabilities.

Voicemail system 170 may include one or more server entities, or other types of computation or communication devices, that gather, process, search, and/or provide information in a manner described herein. For example, voicemail system 170 may include one or more devices for receiving, storing, and providing voicemail messages for subscribers of the voicemail system. Voicemail system 170 may interface with other backend servers (e.g., notification servers, management servers, and message stores (not shown)) to provide voicemail services to subscribers. Each of voicemail systems 170 may service particular subscriber accounts. Calls received at the wrong VM system 170 (e.g., a VM system that does not have account information for a particular caller) can be routed to another VM system 170. For example, if a direct access voicemail call for a subscriber's account on VM system 170-2 is incorrectly directed to VM system 170-1, VM system 170-1 may include a solution to re-direct the call over provider network 120 to the correct VM system 170-2 (e.g., based on queries of VM systems 170-2 through 170-M). However, such re-directing by VM systems 170 may increase the traffic burden on provider network 120.

Proxy server cluster 180 may include one or more server devices, or other types of computation or communication devices, that gather, process, search, and/or provide information in a manner described herein. In an exemplary implementation, proxy server cluster 180 may communicate with application servers 160 and/or VM systems 170, and may perform (e.g., on application servers 160) functions, such as making routing decisions, topology mapping to minimize cost and/or achieve optimal performance, and load balancing to balance loads on application servers 160.

In implementations described herein, on-net calls from CPE 130 may be routed by service provider network 120 to a VM system 170 associated with an account for CPE 130. A particular SBC (e.g., SBC 150) may be assigned to manage signaling and/or media streams for all calls from/to CPE 130 within customer network 110. Voicemail customers may be provided with a single toll-free access number to access voicemail systems 170. SBC 150 may include a set of rules to route calls to the single toll-free access number, received from CPE 130, to a particular application server 160 and VM system 170 appropriate for the calling CPE 130. When SBC 150 receives a call to the single toll-free access number, SBC 150 may identify the telephone number included within a SIP "from" header or PAI for the call. SBC 150 may conduct a look-up to determine a ten-digit TN customer access number that has a user account built on, for example, application server 160-1. The ten-digit TN may also be assigned as the access number for VM system 170-1. Establishing a set of rules in SBC 150 may alleviate the amount of voicemail traffic placed on any one application server 160 and may eliminate excess traffic that VM system 170 may add to provider network 120 when re-directing calls to the correct VM system 170.

Although FIG. 1 illustrates exemplary components of network 100, in other implementations, network 100 may include fewer, additional, different, or differently arranged components than those depicted in FIG. 1. For example, functions of SBC 150 may be performed by another edge device (not shown) of provider network 120. Additionally, or alternatively, devices may be combined into a single device or may be implemented as two or more devices.

Figure 2:
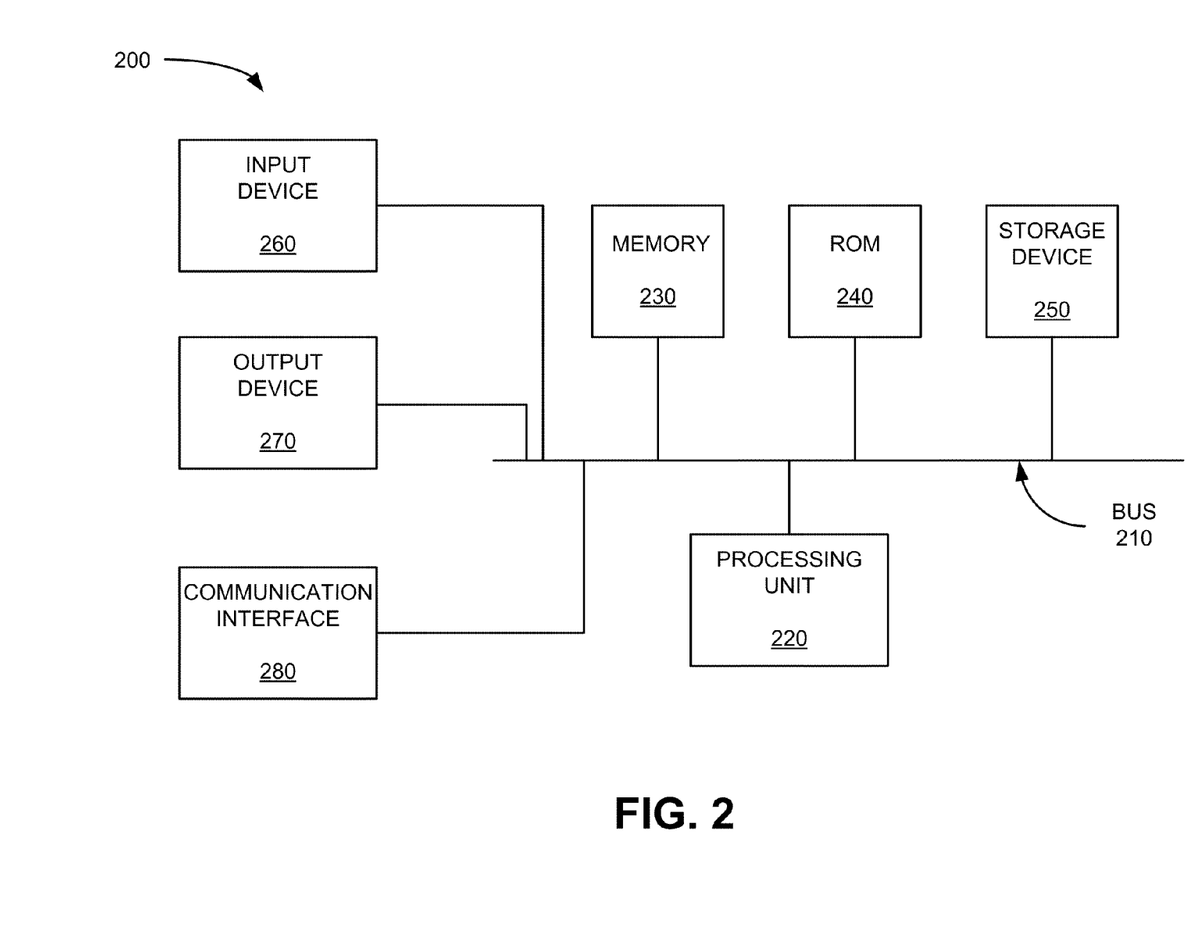
FIG. 2 is a block diagram of exemplary components of a device that may correspond to customer premises equipment, a session border controller, an application server, and/or other devices of FIG. 1.

FIG. 2 is a diagram illustrating exemplary components of a device 200 that may correspond to one or more of the devices depicted in FIG. 1. For example, device 200 may correspond to certain CPE 130, SBC 150, application servers 160, and/or components of VM systems 170 and proxy server cluster 180. As illustrated, device 200 may include a bus 210, a processing unit 220, a main memory 230, a read-only memory (ROM) 240, a storage device 250, an input device 260, an output device 270, and a communication interface 280.

Bus 210 may include a path that permits communication among the components of device 200. Processing unit 220 may include one or more processors, microprocessors, or other types of processing units, such as application-specific integrated circuits (ASICs), field-programmable gate arrays (FPGAs), etc., that may interpret and execute instructions.

Main memory 230 may include a random access memory (RAM) or another type of dynamic storage device that stores information and instructions for execution by processing unit 220. ROM 240 may include a ROM device or another type of static storage device that may store static information and instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, voice recognition and/or biometric mechanisms, a touch-screen interface, etc. Output device 270 may include a mechanism that outputs information to the operator, including a display, a light-emitting diode (LED), a speaker, etc. Communication interface 280 may include any transceiver-like mechanism that enables device 200 to communicate with other devices and/or systems. For example, communication interface 280 may include mechanisms for communicating with another device or system via a network, such as customer network 110 and/or provider network 120.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of device 200, in other implementations, device 200 may include fewer, different, differently arranged, or additional components than those depicted in FIG. 2. Additionally, or alternatively, one or more components of device 200 may perform one or more other tasks described as being performed by one or more other components of device 200.

Figure 3:
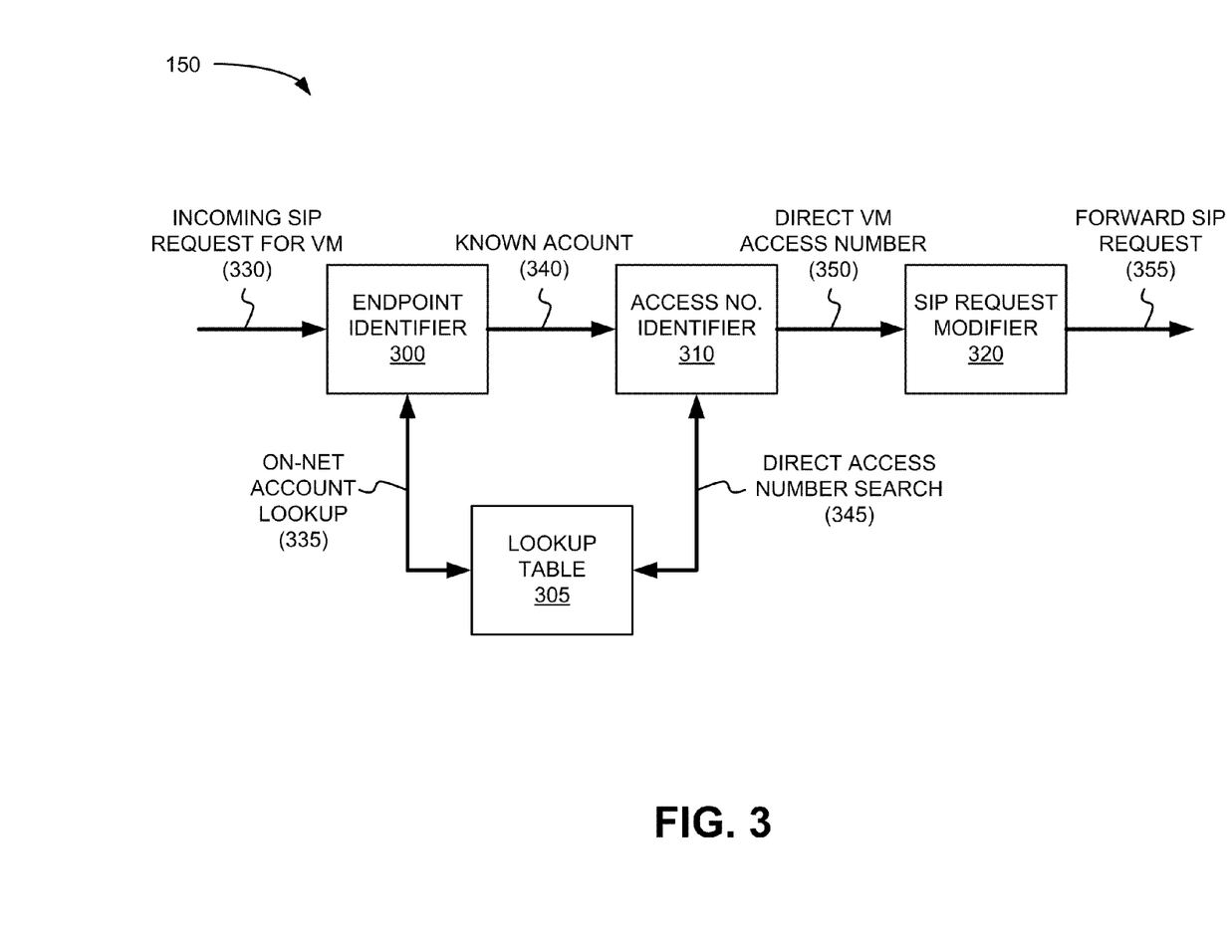
FIG. 3 is a diagram of exemplary functional components of the session border controller depicted in FIG. 1.

FIG. 3 is a diagram of exemplary functional components of SBC 150. In one implementation, the functions described in connection with FIG. 3 may be performed by one or more of the components of device 200 (FIG. 2). For example, the functions described in connection with FIG. 3 may be implemented using a set of instructions stored in memory 230 and executed by processing unit 220. As shown in FIG. 3, SBC 150 may include an endpoint identifier 300, a lookup table 305, an access number identifier 310, and a SIP request modifier 320.

Endpoint identifier 300 may include hardware or a combination of hardware and software that may receive an incoming on-net VoIP call and determine that the call is for a general voicemail number. For example, as indicated by reference number 330, endpoint identifier 300 may receive, e.g., from CPE 130, an incoming call to a general voicemail access number in the form of a SIP INVITE message. Endpoint identifier 300 may determine whether CPE 130 has an account for which direct voicemail access services can be provided. For example, endpoint identifier 300 may perform an on-net account lookup 335 using lookup table 305 to determine if a "From" field of the SIP INVITE header includes a telephone number that matches a subscriber's number (e.g., to validate that a user account is registered for VM services). In other implementations, endpoint identifier 300 may perform on-net account lookup 335 using other information or portions of information to determine whether CPE 130 has an account for which direct voicemail access services can be provided.

If the SIP INVITE header includes a number for which direct voicemail access services can be provided, then endpoint identifier may identify the call as a known-account call 340 and forward the call to access number identifier 310.

Lookup table 305 may include one or more storage devices that may store information received by and/or provided to SBC 150. For example, lookup table 305 may include particular direct access numbers associated with each on-net originating number or with a portion (e.g., a numbering plan area (NPA) extension) of each on-net originating number serviced by SBC 150. Lookup table 305 is described further in connection with FIG. 4.

Figure 4:
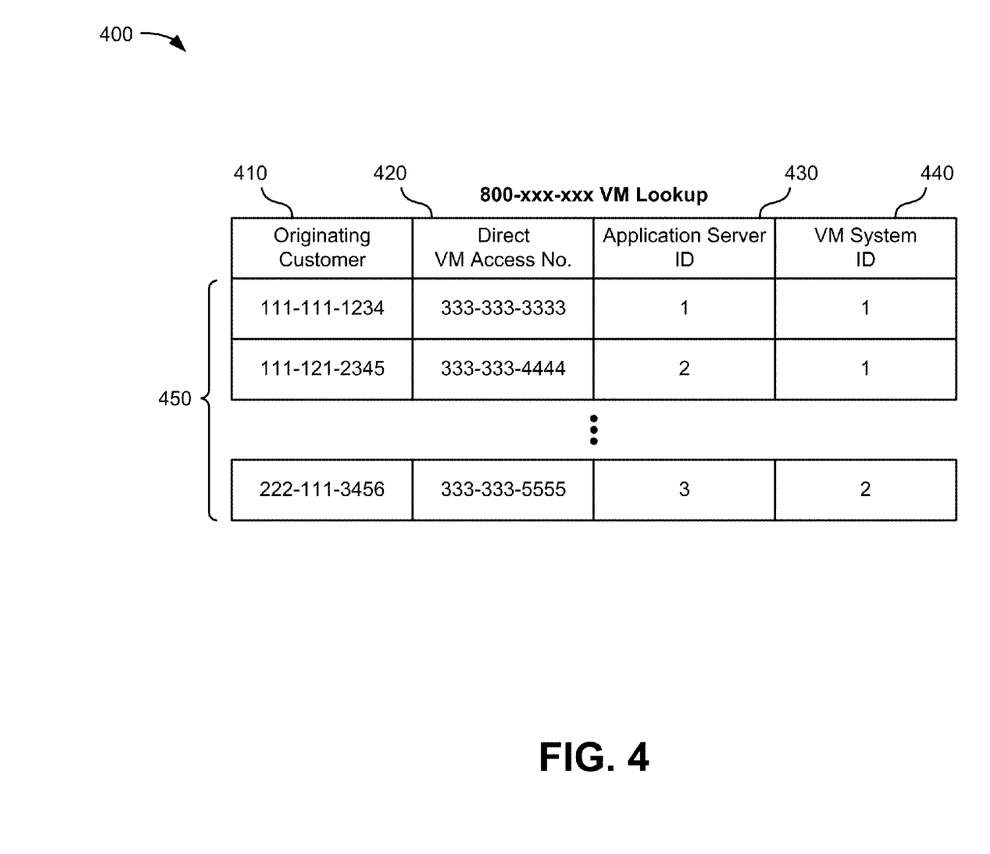
FIG. 4 depicts portions of an exemplary data structure that may be used by the session border controller of FIG. 1.

FIG. 4 depicts portions of an exemplary data structure 400 that may correspond to portions of lookup table 305. Data structure 400 may be stored in, or accessible by, SBC 150. Data structure 400 may be used by SBC 150 to identify if a SIP INVITE from a particular originator (e.g., originating CPE 130) to a voicemail system is from a recognized account. Data structure 400 may also be used by SBC 150 to identify a particular direct access number for a VM system 170 associated with the particular originator. Data structure 400 may be implemented in a single database, in multiple databases, or as one or more tables.

As illustrated in FIG. 4, data structure 400 may include a variety of information associated with a toll-free access number for a voicemail service. For example, data structure 400 may include an originating customer field 410, a direct VM access number field 420, an application server ID field 430, a voicemail system field 440, and a variety of records or entries 450 associated with fields 410-440.

Originating customer field 410 may include an IP address, a uniform resource identifier (URI), or other indicators for an originating device, such as CPE 130. Direct VM access number field 420 may include an IP address, a URI, or other indicators for a customer access number that has an account built on a particular application server 160, indicated in application server ID field 430. The IP address, URI, or other indicators may also be assigned as the access number for a particular VM system 170, indicated in voicemail system field 440.

As shown in FIG. 4, a particular entry 450 (e.g., "111-111-1234") in originating customer field 410 may be associated with an entry (e.g., "333-333-3333") in direct VM access number field 420 that may be substituted for the general 800 number associated with data structure 400. Originating customers may be assigned to particular direct voicemail access numbers based on, for example, geographic region. In one implementation, originating customers may be assigned to a direct voicemail access number based on the North American Numbering Plan (NPA-NXX). Thus, while data structure 400 is shown with entries 450 in originating customer field 410 that include 10-digit telephone numbers, in another implementation, only the numbering plan area (NPA) and/or exchange (NXX) may be included in entries for originating customer field 410 of data structure 400.

Although FIG. 4 shows exemplary information that may be provided in data structure 400, in other implementations, data structure 400 may contain less, different, differently-arranged, or additional information than depicted in FIG. 4.

Returning to FIG. 3, access number identifier 310 may include hardware or a combination of hardware and software that may receive on-net call 340 from endpoint identifier 300 and may conduct a direct access number search 345 to identify, for the originating CPE 130, a ten-digit direct access number that has an account built on a particular application server 160. For example, access number identifier 310 may perform direct access number search 345 using lookup table 305 to match the originating telephone number (e.g., determined from the "From" field or PAI field of the SIP INVITE header and included in originating customer field 410) with a particular direct access number (e.g., from direct VM access number field 420). The direct access number may be associated with a particular application server 160 and a particular VM system 170. Access number identifier 310 may provide the appropriate direct access number, as direct VM access number 350, to SIP request modifier 320.

SIP request modifier 320 may include hardware or a combination of hardware and software that may receive direct VM access number 350 from access number identifier 310 and may substitute direct VM access number 350 for the general 800 number included in the originally-received SIP invite request (e.g., SIP request 330) from CPE 130. SIP request modifier 320 may forward the modified SIP request to the application server associated with the direct VM access number.

Although FIG. 3 shows exemplary functional components of SBC 150, in other implementations, SBC 150 may contain fewer, different, differently arranged, or additional functional components than depicted in FIG. 3. In still other implementations, one or more functional components of SBC 150 may perform one or more other tasks described as being performed by one or more other functional components of SBC 150.

Figure 5:
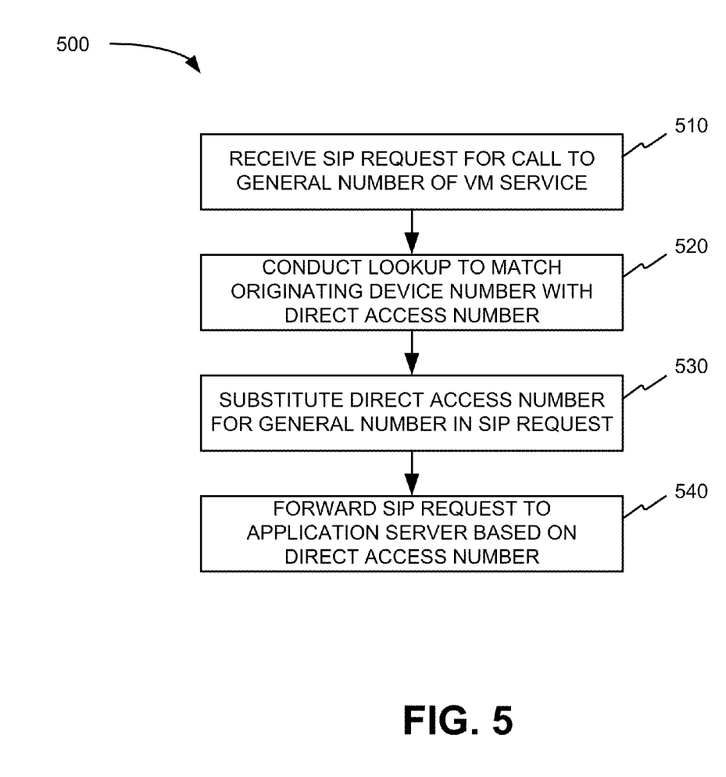
FIG. 5 provides a flow chart of an exemplary process for providing on-net direct access to voicemail according to implementations described herein.

FIG. 5 provides a flow chart of an exemplary process 500 for providing on-net direct access to voicemail according to implementations described herein. In one implementation, some or all of process 500 may be performed by SBC 150. In other implementations, some or all of process 500 may be performed by SBC 150 in conjunction with one or more devices associated with a provider network (e.g., provider network 120).

Process 500 may include receiving a SIP request for a call to a general number for a voicemail service (block 510) and conducting a lookup to match an originating device number with a direct access number (block 520). For example, as described above in connection with FIG. 3, if the SIP INVITE header includes a number for which direct voicemail access services can be provided, then endpoint identifier may identify the call as a known-account call 340 and forward the call to access number identifier 310. Access number identifier 310 may perform direct access number search 345 using lookup table 305 to match the originating telephone number (e.g., determined from the "From" field or PAI field of the SIP INVITE header and included in originating customer field 410) with a particular direct access number (e.g., from direct VM access number field 420). The direct access number may be associated with a particular application server 160 and a particular VM system 170. Access number identifier 310 may provide the appropriate direct access number, as direct VM access number 350, to SIP request modifier 320.

Returning to FIG. 5, the direct access number may be substituted for the general number in the SIP request (block 530), and the SIP request may be forwarded to an application server based on the direct access number (block 540). For example, as described above in connection with FIG. 3, SIP request modifier 320 may receive direct VM access number 350 from access number identifier 310 and may substitute direct VM access number 350 for the general 800 number included in the originally-received SIP invite request from CPE 130. SIP request modifier 320 may forward the modified SIP request to the application server associated with the direct VM access number.

Figure 6A:
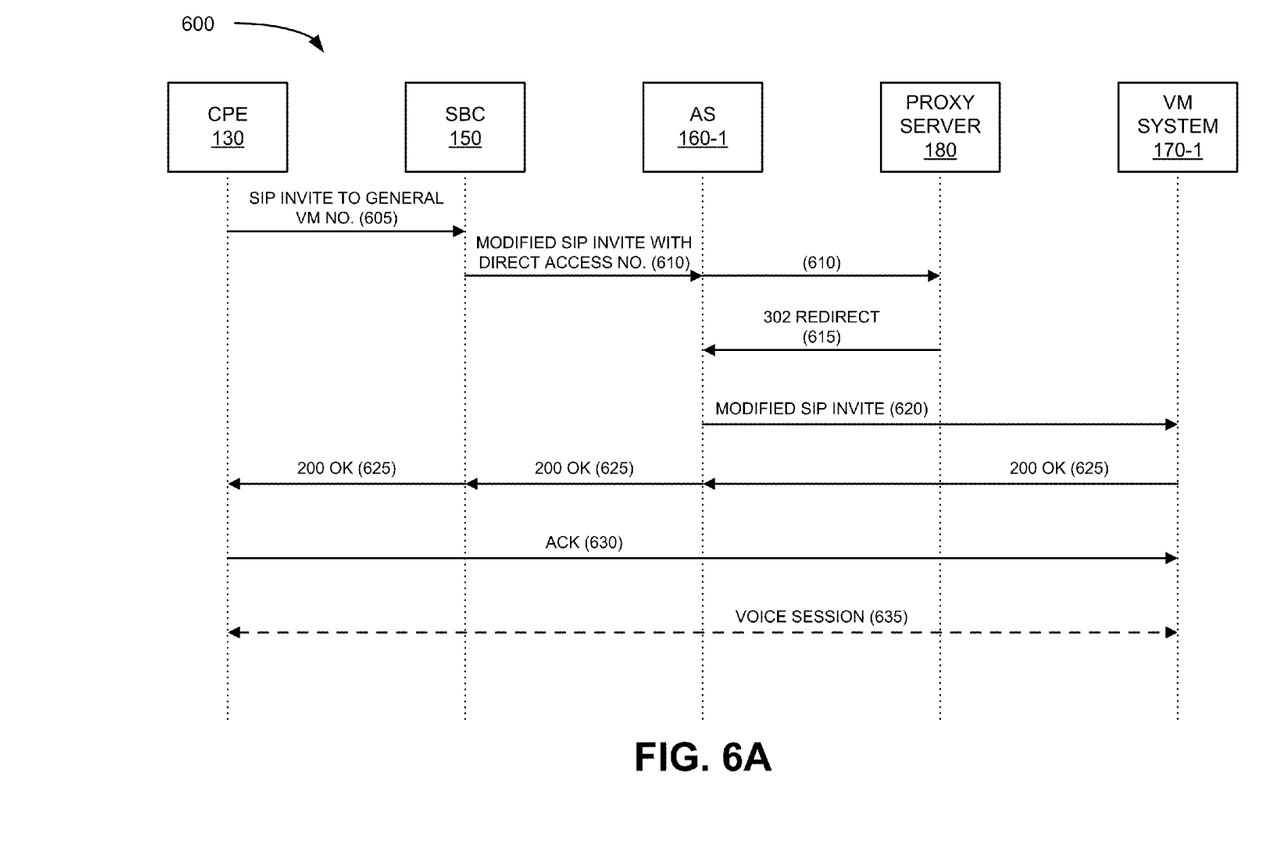
FIGS. 6A and 6B provide diagrams of exemplary interactions among components of exemplary portions of the network of FIG. 1.

FIG. 6A provides a diagram of exemplary interactions among components of an exemplary portion 600 of network 100. As shown in FIG. 6A, exemplary network portion 600 may include CPE 130, SBC 150, application server 160-1, VM system 170-1, and proxy server 180. CPE 130, application server 160-1, VM system 170-1, and proxy server 180 may include the features described above in connection with, for example, FIG. 1. SBC 150 may include the features described above in connection with, for example, FIGS. 1-5.

A voicemail service may provide a general number (e.g., a toll-free or "800" number) that subscribers may call to access voicemail services from one of a number of VM systems (such as VM system 170-1). As further shown in FIG. 6A, CPE 130 may initiate a phone call to the general number for the voicemail service by sending a SIP INVITE message that is received at SBC 150, as indicated by reference number 605.

SBC 150 may conduct a lookup to determine a direct access number for the appropriate voicemail system. SBC 150 may replace the general voicemail number with the direct access number that has a user account built on application server 160-1 (e.g., to create a modified SIP INVITE message). SBC 150 may forward the modified SIP INVITE message to application server 160-1, as indicated by reference number 610.

Application server 160-1 may forward the modified SIP INVITE message to proxy server cluster 180, and proxy server cluster 180 may respond with, for example, a SIP "302" redirect message as indicted by reference number 615. Application server 160-1 may then send the modified SIP INVITE message to the particular voicemail system (e.g., VM system 170-1) associated with the direct access number, as indicated by reference number 620. VM system 170-1 may provide a SIP response message (e.g., a SIP "200" OK message), as indicated by reference number 625. CPE 130 may then provide a SIP acknowledgement message, as indicated by reference number 630, and the voice session between CPE 130 and VM system 170-1 may be established, as indicated by reference number 635.

Figure 6B:
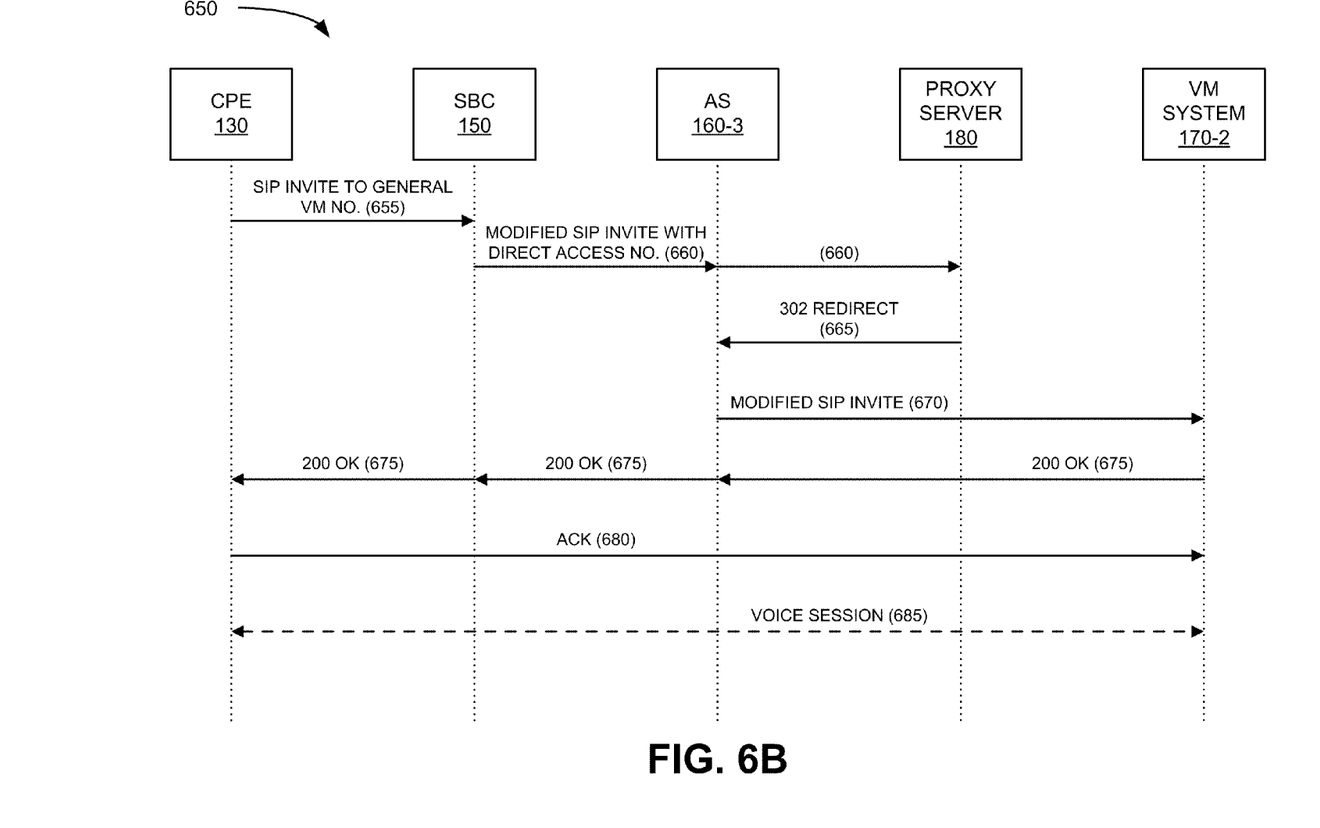

FIG. 6B provides a diagram of exemplary interactions among components of another exemplary portion 650 of network 100. As shown in FIG. 6B, exemplary network portion 650 may include CPE 130 (e.g., a different CPE 130 than that of FIG. 6B), SBC 150, application server 160-3, VM system 170-2, and proxy server 180. CPE 130, application server 160-3, VM system 170-2, and proxy server 180 may include the features described above in connection with, for example, FIGS. 1 and 6A. SBC 150 may include the features described above in connection with, for example, FIGS. 1-6A.

Assume CPE device 130 of FIG. 6B is associated with a different user account and geographic location from CPE 130 of FIG. 6A. Similar to FIG. 6A, CPE 130 may initiate a phone call to the general number for the voicemail service (e.g., the same general number as used by CPE 130 of FIG. 6A) by sending a SIP INVITE message that is received at SBC 150, as indicated by reference number 655.

SBC 150 may conduct a lookup to determine a direct access number for the appropriate voicemail system. Because CPE 130 is in a different geographic location (e.g., with a different NPA-NXX exchange), SBC 150 may replace the general voicemail number with the direct access number that has a user account built on application server 160-3 (e.g., to create a modified SIP INVITE message). SBC 150 may forward the modified SIP INVITE message to application server 160-3, as indicated by reference number 660.

Once the modified SIP INVITE message has been received at proxy server 180, interactions may proceed similarly to that of FIG. 6A. Application server 160-3 may forward the modified SIP INVITE message to proxy server cluster 180, and proxy server cluster 180 may respond with a SIP "302" redirect message as indicted by reference number 665. Application server 160-3 may then send the modified SIP INVITE message to the particular voicemail system (e.g., VM system 170-2) associated with the direct access number, as indicated by reference number 670. VM system 170-2 may provide a SIP "200" OK message, as indicated by reference number 675. CPE 130 may then provide a SIP acknowledge message, as indicated by reference number 680, and the voice session between CPE 130 and VM system 170-2 may be established, as indicated by reference number 685.

Implementations described herein may provide systems and/or methods that may receive a SIP request message from an originating device, where the SIP request message includes a general number for a voicemail service and where the voicemail service includes multiple voicemail systems. The systems and/or methods may determine whether the originating device is associated with a voice-over-Internet-protocol (VoIP) account on the provider network and, when the originating device is associated with a VoIP account, may select a direct access number assigned to a voicemail system, of the multiple voicemail systems, that services the VoIP account. The systems and/or methods may also associate the direct access number and the SIP request message, and forward, based on the direct access number, the SIP request message to an application server.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while a series of blocks has been described with regard to the flowchart of FIG. 5, the order of the blocks may differ in other implementations. Further, non-dependent blocks may be performed in parallel.

Also, although the Session Initiation Protocol (SIP) may be mentioned in reference to an implementation associated with the concepts described herein, other IP signaling protocols may be employed (e.g., H.323, Media Gateway Control Protocol (MGCP), and/or Megaco/H.248). Accordingly, the concepts described herein are not dependent on employing a particular protocol.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    receiving, by a computing device, a Session Initiation Protocol (SIP) request message from an originating device,
        the SIP request message including a general number for a voicemail service, and
        the voicemail service including multiple voicemail systems;
    determining, by the computing device, whether the originating device is associated with a voice-over-Internet-protocol (VoIP) account on a provider network;
    selecting, by the computing device and when the originating device is associated with the VoIP account, a direct access number assigned to a voicemail system, of the multiple voicemail systems, that services the VoIP account,
        the direct access number being selected based on a numbering plan area associated with the originating device,
        the direct access number corresponding to an identifier associated with the originating device,
        the identifier associated with the originating device being different than the direct access number and being different than the general number,
        the direct access number being selected to match the numbering plan area, and
        wherein selecting the direct access number includes:
            accessing a data structure that includes:
                information associating the general number with the direct access number,
                information associating the direct access number with an application server, and
                information associating the direct access number with the voicemail system;
    replacing, by the computing device, the general number in the SIP request message with the direct access number to create a modified SIP request;
    forwarding, by the computing device and based on replacing the general number with the direct access number, the modified SIP request message to the application server;
    receiving, by the computing device and based on forwarding the modified SIP request message to the application server, a SIP response message from the voicemail system; and
    forwarding, by the computing device and based on receiving the SIP response message, the SIP response message to the originating device.

2. The method of claim 1, where the application server is selected from multiple application servers based on a user account for the direct access number.

3. The method of claim 1, where the direct access number is selected from a plurality of direct access numbers assigned to the voicemail system that services the account, and where at least some of the plurality of direct access numbers assigned to the voicemail system are associated with user accounts for different application servers.

4. The method of claim 1, where selecting the direct access number assigned to the voicemail system comprises:
    selecting, from multiple direct access numbers, the direct access number that corresponds to the numbering plan area.

5. The method of claim 1, where the numbering plan area associated with the originating device is determined based on at least one of:
    a from header of the SIP request message, or
    a P-asserted identity of the SIP request message.

6. The method of claim 1, where the computing device comprises a session border controller.

7. A device comprising:
    a memory to store instructions; and
    a processor to execute the instructions to:
        receive, from an originating device, a session initiation protocol (SIP) request message for a voice-over-Internet-protocol (VoIP) call to a general number for a voicemail service, the voicemail service including multiple voicemail systems;
determine a geographic area of the originating device based on information in the SIP request message;
select a direct access telephone number assigned to a voicemail system, of the multiple voicemail systems, that services the geographic area of the originating device,
the direct access telephone number corresponding to an identifier associated with the originating device,
the identifier associated with the originating device being different than the direct access telephone number and being different than the general number,
the direct access number being selected to match a numbering plan area associated with the originating device, and
wherein the processor, when selecting the direct access telephone number, is to:
access a data structure that includes:
information associating the general number with the direct access telephone number,
information associating the direct access telephone number with an application server, and
information associating the direct access telephone number with the voicemail system;
replace the general number in the SIP request message with the direct access telephone number to create a modified SIP request;
forward, based on replacing the general number with the direct access telephone number, the modified SIP request message to the application server;
receive, based on forwarding the modified SIP request message to the application server, a SIP response message from the voicemail system; and
forward, based on receiving the SIP response message, the SIP response message to the originating device.

8. The device of claim 7, where the application server is selected from multiple application servers, and where a user account for the direct access telephone number is associated with the application server.

9. The device of claim 7, where the memory further stores a listing of direct access telephone numbers for multiple numbering plan areas.

10. The device of claim 9, where each direct access telephone number is associated with a respective application server of a plurality of application servers.

11. The device of claim 7, where the geographic area is determined based on a numbering plan area associated with the originating device.

12. The device of claim 11, where the numbering plan area is identified in a from header or a P-asserted identity in the SIP request message.

13. The device of claim 7, where the device comprises a session border controller.

14. A system comprising:
one or more devices to:
determine whether an originating device, of a session initiation protocol (SIP) request message for a voice-over-Internet-protocol (VoIP) call to a general number for a voicemail service, has an account with a VoIP service provider;
store particular direct access numbers for a plurality of application servers, each direct access number being associated with a numbering plan area;
identify a numbering plan area of the originating device;
match the numbering plan area of the originating device with a particular direct access number,
the particular direct access number corresponding to an identifier associated with the originating device,
the identifier associated with the originating device being different than the particular direct access number and being different than the general number, and
the one or more devices, when matching the numbering plan area of the originating device with the particular direct access number, being further to:
access a data structure that includes:
information associating the general number with the particular direct access number,
information associating the particular direct access number with an application server, and
information associating the particular direct access number with a voicemail system;
replace the general number in the SIP request message with the particular direct access number to create a modified SIP request;
forward the modified SIP request message to the application server;
receive, based on forwarding the modified SIP request message to the application server, a SIP response message from the voicemail system; and
forward, based on receiving the SIP response message, the SIP response message to the originating device.

15. The system of claim 14, where the application server is selected from multiple application servers based on a user account for the direct access number.

16. The system of claim 14, where the numbering plan area associated with the direct access number is based on at least one of:
a from header of the SIP request message, or
a P-asserted identity of the SIP request message.

17. The system of claim 14, where the general number is an 800 number.

18. A non-transitory computer-readable medium storing instructions, the instructions comprising:
one or more instructions, executable by a processor of a device, to cause the processor to:
receive, from an originating device, a session initiation protocol (SIP) request message for a voice-over-Internet-protocol (VoIP) call to a general number for a voicemail service,
the voicemail service including multiple voicemail systems;
determine a geographic area of the originating device based on information in the SIP request message;
select a direct access telephone number assigned to a voicemail system, of the multiple voicemail systems, that services the geographic area of the originating device,
the direct access telephone number corresponding to an identifier associated with the originating device,
the identifier associated with the originating device being different than the direct access telephone number and being different than the general number,
the direct access number being selected to match a numbering plan area associated with the originating device, and
the one or more instructions to select the direct access telephone number including:
one or more instructions to access a data structure that includes:

information associating the general number with the direct access telephone number,
information associating the direct access telephone number with an application server, and
information associating the direct access telephone number with the voicemail system;

replace the general number in the SIP request message with the direct access telephone number to create a modified SIP request;

forward, based on replacing the general number with the direct access telephone number, the modified SIP request message to the application server;

receive, based on forwarding the modified SIP request message to the application server, a SIP response message from the voicemail system; and forward, based on receiving the SIP response message, the SIP response message to the originating device.

19. The non-transitory computer-readable medium of claim 18, where the application server is selected from multiple application servers based on a user account for the direct access telephone number.

20. The non-transitory computer-readable medium of claim 18, where the general number is an 800 number.

\* \* \* \* \*